United States Patent [19]

Noël et al.

[11] Patent Number: 5,264,294
[45] Date of Patent: Nov. 23, 1993

[54] MATERIAL MIXTURE, METHOD OF PROCESSING SAME AND USE THEREOF

[75] Inventors: Léon Noël, Viroflang, France; Hans T. Steine, Cugy; Horst Seifahrt, Belmont, both of Switzerland

[73] Assignee: Castolin S.A., Sulpice, Switzerland

[21] Appl. No.: 734,219

[22] Filed: Jul. 22, 1991

[30] Foreign Application Priority Data

Jul. 23, 1990 [DE] Fed. Rep. of Germany ....... 4023404

[51] Int. Cl.⁵ ............................................. B22F 7/04
[52] U.S. Cl. ................................... 428/561; 428/546; 428/553
[58] Field of Search ............... 728/553, 557, 558; 428/554, 545, 546, 548, 553, 558, 559, 560, 561, 567, 569

[56] References Cited

U.S. PATENT DOCUMENTS

| | | | |
|---|---|---|---|
| 4,056,654 | 11/1977 | Kompanek | 428/697 |
| 4,137,446 | 1/1979 | Blanpain | 219/145.22 |
| 4,228,223 | 10/1980 | Knotek et al. | 428/558 |
| 4,396,820 | 8/1983 | Puschner | 219/121 |
| 4,423,119 | 12/1983 | Brown et al. | 428/558 |
| 4,426,428 | 1/1984 | Kammer et al. | 428/561 |
| 4,495,255 | 1/1985 | Draper et al. | 428/669 |
| 4,518,444 | 5/1985 | Albrecht et al. | 148/402 |
| 4,640,815 | 2/1987 | Brosius et al. | 419/8 |
| 4,802,131 | 1/1989 | Marshall et al. | 428/558 |
| 4,871,621 | 10/1989 | Bagley et al. | 428/549 |
| 4,911,990 | 3/1990 | Prewo et al. | 428/554 |

*Primary Examiner*—Donald P. Walsh
*Assistant Examiner*—Daniel Jenkins
*Attorney, Agent, or Firm*—Bachman & LaPointe

[57] ABSTRACT

A material mixture comprises at least two metallic components with different properties on a nickel base with additions of up to 21% by weight of chromium and a total addition of up to 21% of the elements B, Si, Fe, the components thereof having been produced in accordance with different processes. In that respect there is to be provided a total addition of up to 21% of the elements B, Si, Fe, Mo and W. That material mixture comprises at least a component in powder form and at least one component in web form, preferably a foil or plate which is of a curved cross-section as the component in web form which surrounds the component in powder form.

18 Claims, No Drawings

MATERIAL MIXTURE, METHOD OF PROCESSING SAME AND USE THEREOF

The invention relates to a material mixture comprising at least two metallic compounds with different properties and a method of processing such a material mixture. The invention also concerns a particular manner of use.

Known processes for coating surfaces on glass shapes, in particular at edges or glass contact surfaces, make use of an autogenous application process which operates with coating materials in powder form. Attempts to automate those processes in order to achieve a sufficient degree of constancy in the mass production of glass shapes have not proven successful hitherto.

The attempt has also been made to deal with that problem by using a plasma coating installation which has a transmitted arc, but that only resulted in partial success.

In all processes used hitherto for coating glass shapes, loose metal powder is used as the coating material, which can be capable of affording good results in a manual application procedure. Having regard to that state of the art, the inventors set themselves the aim of automating the provision of glass shapes with a metal-bearing protective layer in mass production, and making the application uniform in order to increase the output of products and the level of economy of manufacture.

That object is achieved by the basic notion of using a material mixture comprising at least two metallic components with different properties on a nickel base with additions of up to 21% by weight of chromium and a total addition of up to 21% of the elements B, Si, Fe, Mo, W, the components of said mixture having been produced in accordance with different processes; the elements Cr, B, Si and Fe are those which are always contained in the mixture provided for coating purposes while Mo and W are those which are added only in specific situations. In accordance with the invention, there are at least one component in powder form and at least one component in web or extended form. The latter component is preferably a foil or plate which is of curved cross-section and which surrounds the component in powder form.

Particularly in accordance with the invention is a material mixture with a chromium content of from 0.1 to 19.9% by weight, preferably from 0.5 to 14.9% by weight, or an iron content of from 0.1 to 8% by weight, preferably from 0.5 to 5.9% by weight.

In accordance with a further feature of the invention the material mixture may have a boron content of from 0 to 5% by weight, preferably from 0.2 to 3.6% by weight, or a silicon content of from 0.2 to 8% by weight, preferably from 0.3 to 4% by weight.

In another embodiment of the invention the material mixture contains molybdenum of up to 9.9% by weight, preferably below 5% by weight, or tungsten of up to 8% by weight, preferably below 3.9% by weight.

The method according to the invention for processing such a material mixture is distinguished in that the material mixture is subjected to heat treatment as a consumable electrode by means of electrical shielded arc welding at the surface in question. In particular that material mixture is to be applied as coatings to glass shapes by metal inert gas welding.

It has then proven advantageous for the material in web or extended or strand form, with a filling comprising one or more metal powders, to be applied to a glass shape by metal inert gas welding.

For spheroidizing purposes, cerium, magnesium, barium or aluminum constituents, each up to a maximum of 1% by weight, are preferably associated with the material mixture.

It is in accordance with this method according to the invention that, for coating a glass shape, at least one metal alloy on a nickel base with additions of B, Si, Fe and optionally Mo and W, with a component in web or strand form containing at least one sprayed metal powder, is applied by metal inert gas welding; the method according to the invention is distinguished in that the described material mixture is subjected to heat treatment by electrical shielded arc welding.

It has also proven advantageous to use the material mixture comprising the two components for glass shapes and for it to be applied by metal inert gas welding. Preferred is a nickel-base alloy which contains additions of Cr, B, Si, Fe, Mo and W.

We claim:

1. A material mixture comprising:
   from 0.1 to 21% chromium;
   the elements boron, silicon, and iron in a total amount up to 21%;
   a first nickel based component (A) and a second nickel based component (B);
   wherein said components comprise at least one component in powder form and at least one component in web or extended form.

2. A material mixture according to claim 1 wherein said component B contains at least 0.1% iron, at least 0.2% silicon, and at least 0.2% boron.

3. A material mixture according to claim 2 containing in component B a total addition of up to 21% of the elements boron, silicon, iron, molybdenum and tungsten.

4. A material mixture according to claim 2 wherein said component in web or extended form is a foil or plate which is of curved cross-section and which surrounds the component in powder form.

5. A material mixture according to claim 2 including from 0.1 to 19.9% chromium.

6. A material mixture according to claim 5 including from 0.5 to 14.9% chromium.

7. A material mixture according to claim 2 including from 0.1 to 8% iron.

8. A material mixture according to claim 7 including from 0.5 to 5.9% iron.

9. A material mixture according to claim 2 including from 0.2 to 5% boron.

10. A material mixture according to claim 9 including from 0.2 to 3.6% boron.

11. A material mixture according to claim 2 including from 0.2 to 8% silicon.

12. A material mixture according to claim 11 including from 0.3 to 4% silicon.

13. A material mixture according to claim 3 including up to 9.9% molybdenum.

14. A material mixture according to claim 13 including up to 5% molybdenum.

15. A material mixture according to claim 3 including up to 8% tungsten.

16. A material mixture according to claim 15 including up to 3.9% tungsten.

17. A material mixture according to claim 2 wherein said mixture contains a component for spheroidizing components of the mixture, said spheroidizing component selected from the group consisting of cerium, magnesium, barium, aluminum and mixtures thereof, in an amount up to 1% by weight each.

18. A material mixture according to claim 2 wherein said mixture is heat treated.